(No Model.)

J. A. SAMMIS.
Nut Lock.

No. 234,894. Patented Nov. 30, 1880.

WITNESSES:
Chas. Nida
C. Sedgwick

INVENTOR:
J. A. Sammis
BY Munn & Co
ATTORNEYS.

UNITED STATES PATENT OFFICE.

JOHN A. SAMMIS, OF BROOKLYN, NEW YORK, ASSIGNOR TO CHARLES S. PHILLIPS, OF SAME PLACE.

NUT-LOCK.

SPECIFICATION forming part of Letters Patent No. 234,894, dated November 30, 1880.

Application filed April 26, 1880. (No model.)

*To all whom it may concern:*

Be it known that I, JOHN A. SAMMIS, of Brooklyn, Kings county, State of New York, have invented a new and useful Improvement in Nut-Locks, of which the following is a specification.

Figure 1:
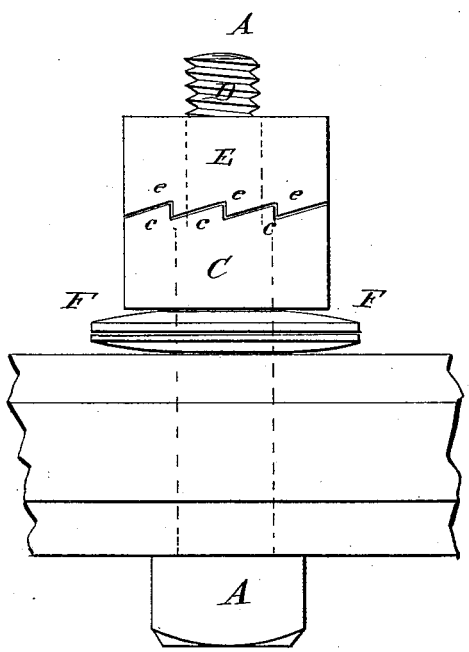
Figure 2:
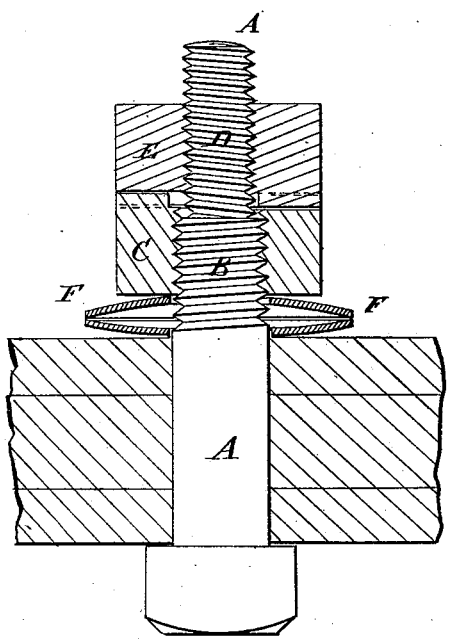
Figure 4:
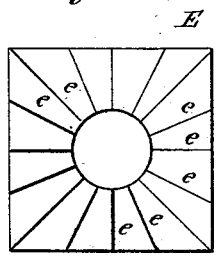
Figure 3:
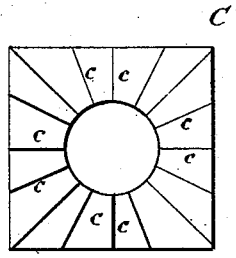

Figure 1 is a side elevation of the improvement. Fig. 2 is a sectional side elevation. Fig. 3 is a plan view of the outer face of the inner nut, and Fig. 4 is a plan view of the inner face of the outer nut.

Similar letters of reference indicate corresponding parts.

The object of this invention is to furnish nut-locks for the bolts of railroad-rail joints and bolts applied to machinery and other uses where the bolts and nuts will be subjected to a constant or intermittent jarring, to prevent the nuts from working loose.

The invention consists in constructing a nut-lock of the bolt having right screw-threads and smaller left screw-thread, the inner nut having right screw-thread and ratchet-teeth, the outer nut having left screw-thread and ratchet-teeth, and the concave spring-washer, whereby the nut will be locked securely against being jarred loose, as will be hereinafter fully described.

A represents a bolt, upon the forward part of which is cut a right screw-thread, B, to receive the screw-thread of the inner or main nut, C. The outer end of the bolt A is turned down, and upon the smaller part thus formed is cut a left screw-thread, D, to fit into the left screw-thread cut in the outer or lock nut, E. Upon the adjacent faces of the nuts C E are formed radial ratchet-teeth *c e*, to interlock with each other, as shown in Fig. 1. Upon the bolt A, between the inner nut, C, and the object to which said bolt is applied, are placed one or more concaved or dish-shaped washers, F. In using the nut-lock the nut C is screwed up so as to compress the spring washer or washers F. The outer nut, E, is then screwed on until its teeth *e* touch, or nearly touch, the teeth *c* of the inner nut, C. The inner nut, C, is then turned off until its teeth *c* engage with the teeth *e* of the outer nut, E, when the nuts C E will be firmly locked against jarring or working loose. At the same time the elasticity of the washer F holds the object to which the bolt A is attached firmly in place. To remove the nuts the inner nut, C, is screwed up until its teeth *c* are free from the teeth *e* of the outer nut, E. This leaves the nut E free to be screwed off, which leaves the nut C also free.

Having thus described my invention, I claim as new and desire to secure by Letters Patent—

1. A nut-lock constructed substantially as herein shown and described, consisting of bolt A, having right screw-thread B and smaller left screw-thread D, the nut C, having right screw-thread and ratchet-teeth *c*, the nut E, having left screw-thread and ratchet-teeth *e*, and the concave spring-washer F, substantially as herein shown and described, whereby the nut will be held securely from jarring loose, as set forth.

2. In a nut-lock, the combination, with the bolt A, having right screw-thread B and smaller left screw-thread D, and the nut C, having right screw-thread and ratchet-teeth *c*, of the nut E, having left screw-thread and ratchet-teeth *e*, and the concave spring-washer F, substantially as herein shown and described, whereby the nut C will be securely locked in place, as set forth.

JOHN A. SAMMIS.

Witnesses:
JAMES T. GRAHAM,
C. SEDGWICK.